(12) United States Patent
Takeuchi et al.

(10) Patent No.: US 6,624,941 B2
(45) Date of Patent: Sep. 23, 2003

(54) DIFFRACTION OPTICAL ELEMENT

(75) Inventors: Shuichi Takeuchi, Saitama-ken (JP); Koichi Maruyama, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 10/166,677

(22) Filed: Jun. 12, 2002

(65) Prior Publication Data

US 2003/0039033 A1 Feb. 27, 2003

(30) Foreign Application Priority Data

Jul. 18, 2001 (JP) ........................................ 2001-218122
Jun. 13, 2001 (JP) ........................................ 2001-179127

(51) Int. Cl.⁷ ............................ G02B 27/44; G02B 5/18
(52) U.S. Cl. ...................... 359/566; 359/565; 359/569; 359/570; 359/571; 359/574; 359/575; 369/112.03; 369/112.07; 369/112.08
(58) Field of Search ............................ 359/565, 566, 359/569, 570, 571, 573, 574, 575; 369/112.03, 112.07, 112.08, 112.12, 112.13, 112.25

(56) References Cited

U.S. PATENT DOCUMENTS

| | | | | |
|---|---|---|---|---|
| 5,838,496 A | * | 11/1998 | Maruyama | 359/565 |
| 5,969,864 A | * | 10/1999 | Chen | 359/569 |
| 6,088,322 A | * | 7/2000 | Broome | 369/112.26 |
| 6,118,594 A | | 9/2000 | Maruyama | |
| 6,191,889 B1 | | 2/2001 | Maruyama | |
| 6,344,935 B1 | | 2/2002 | Maruyama | |

FOREIGN PATENT DOCUMENTS

EP           1102251          5/2001

* cited by examiner

Primary Examiner—John Juba
Assistant Examiner—Leo Boutsikaris
(74) Attorney, Agent, or Firm—Greenblum & Bernstein, P.L.C.

(57) ABSTRACT

A diffraction optical element is configured such that a plurality of annular zones having minute steps extending in a direction of the optical axis therebetween are formed on a base element. The plurality of annular zones include narrow and wide zones respectively satisfying conditions (1) and (2):

$$\Delta Z(i) < (1/2) \cdot \Delta E(i) \quad (1),$$

and $$\Delta Z(i) > (3/2) \cdot \Delta E(i) \quad (2),$$

wherein, i represents the order of the steps counted from the optical axis, $\Delta E(i)$ represents an absolute value of an OPD provided by the i-th step, and $\Delta Z(i)$ represents an absolute value of a difference between OPDs provided, with respect to a base curve, by an inner side end portion and outer side end portion of an annular zone between an i-th step and (i+1)-th step.

10 Claims, 4 Drawing Sheets

DIFFRACTION OPTICAL ELEMENT

BACKGROUND OF THE INVENTION

The present invention relates to a diffraction optical element making use of a high-order diffraction light, and an objective lens for an optical pick-up making use of such an diffraction optical element.

Conventionally, a diffraction optical element provided with a diffraction lens structure has been used in combination with a refractive lens in order to compensate for chromatic aberration, or change of characteristics due to temperature change. The diffraction lens structure is generally composed of a plurality of annular zones having minute steps, extending in a direction of an optical axis, therebetween. The diffraction lens structure may be formed on an optical element, which may be or may not be a refractive lens. In the field of an objective lens for an optical pick-up, the diffraction lens structure is formed on a refraction surface of an objective lens. In particular, a commercially produced objective lens for an optical pick-up is formed from resin using a metal mold.

Figure 6:
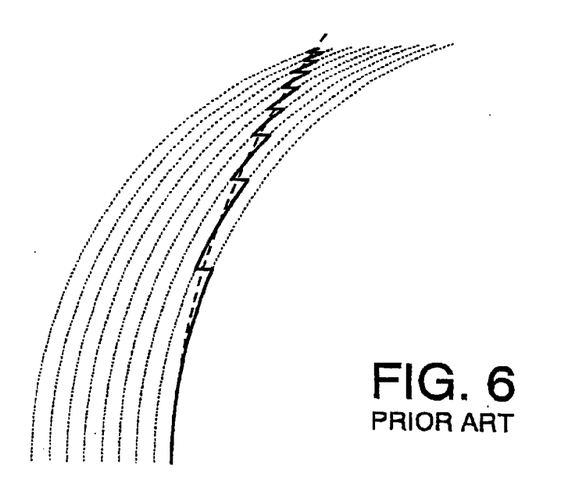
FIG. 6 illustrate a structure of a conventional diffractive optical element.

The steps between the annular zones of the diffraction lens structure is determined in accordance with an order of the diffraction component and the wavelength of the light. Given that the order is m, and wavelength is λ, the steps is determined such that an optical path difference (hereinafter referred to as ODP) of m×λ is given between the inside and outside of each step. FIG. 6 illustrates a cross-section of a conventional diffraction lens structure using a first order diffraction light. The optical axis is located on the lower side of FIG. 6. As shown in FIG. 6, the width of an outer annular zone is smaller. In FIG. 6, broken lines having a smaller pitch represent lines extending through respective annular zones. A distance between two adjoining broken lines corresponds to an ODP of one wavelength, which is given by the step between adjoining zones. In other words, the diffraction lens structure shown in FIG. 6 provides first order diffraction light by providing the OPD of one wavelength at the steps between the annular zones. Broken lines having a longer pitch indicate a base curve of the refractive lens on which the diffraction lens structure is profiled.

Figure 7A:
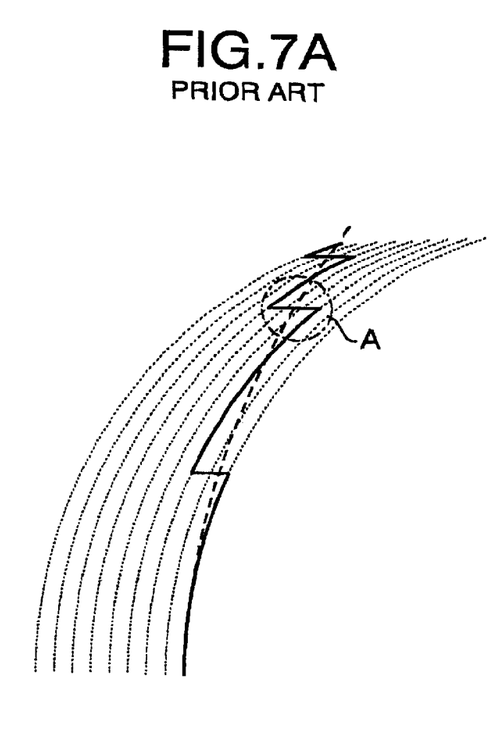
FIG. 7A illustrates the shape of a conventional diffractive optical element.
Figure 7B:
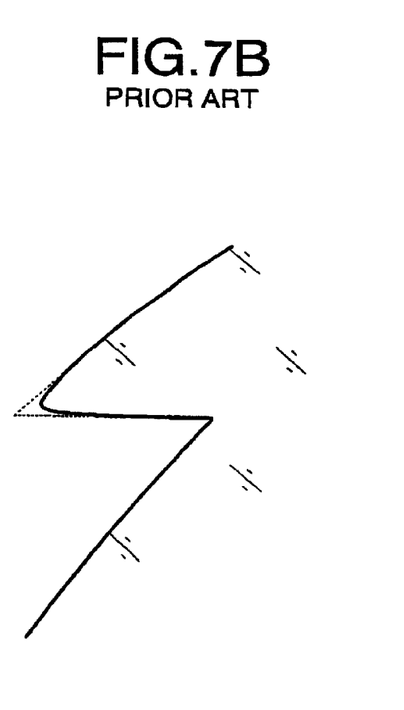
FIG. 7B is an enlarged view of a circled portion in FIG. 7A.

FIG. 7A shows a cross-section of a conventional diffraction lens structure making use of high order diffraction light. FIG. 7B is an enlarged view of a circled portion A in FIG. 7A. A step closer to the optical axis provides an ODP of two wavelengths, and each of two steps at a peripheral area provides an OPD of three wavelengths. With this configuration, relatively strong high order diffraction components are obtained.

If a diffractive optical element is formed by resin molding, the diffraction lens structure may become dulled because of a dull shape of the mold and/or insufficient injection of resin material. Effects of such a dulled shape of the diffraction structure is larger for a greater step, and diffraction efficiency is lowered accordingly. If the step provides an OPD of one wavelength as shown in FIG. 6, the effects of dulled shape of the diffraction lens structure is relatively small, and the diffraction efficiency may not be lowered significantly. However, if the step is relatively large as shown in FIG. 7A, the degree of dulled condition is relatively large, as shown by solid line in FIG. 7B in comparison to a designed shape indicated by broken lines. As shown in FIG. 7B, if the dulled portion becomes relatively large, the diffractive efficiency is lowered significantly.

SUMMARY OF THE INVENTION

The present invention is advantageous in that it provides a diffractive optical element, which has less effects on the diffraction efficiency even though the diffractive optical element is to be designed to use high order diffraction components.

According to an aspect of the invention, there is provided a diffraction optical element, including a base element, and a diffraction lens structure including a plurality of annular zones concentrically arranged about an optical axis of the base element, minute steps extending in a direction of the optical axis being formed between the plurality of annular zones, the plurality of annular zones being formed on a surface of the base element. The plurality of annular zones include at least one narrow zone satisfying condition (1) and at least one wide zone satisfying condition (2):

$$\Delta Z(i) < (1/2) \cdot \Delta E(i) \qquad (1),$$

and $$\Delta Z(i) > (3/2) \cdot \Delta E(i) \qquad (2),$$

wherein, i represents the order of the steps counted from the optical axis, ΔE(i) represents an absolute value of an OPD provided by the i-th step, and ΔZ(i) represents an absolute value of a difference between OPDs provided, with respect to a base curve, by an inner side end portion and outer side end portion of an annular zone between an i-th step and (i+1)-th step.

With the above configuration, when relatively large steps are to be formed in order to use a relatively high order diffraction light, by forming narrow zones, effects of the dulled shape can be suppressed, and higher diffraction efficiency can be achieved than a case where large steps are formed without sub-steps as in the conventional art.

Preferably, the diffraction optical element includes a plurality of wide zones and a plurality of narrow zones. If a plurality of wavelengths are used, it is preferable that the value of ΔE(i) is substantially equal to the shortest one of wavelengths to be used. If the diffraction components of third or higher order are used, it is preferable that a plurality of narrow zones are arranged between a pair of wide zones.

Optionally, the base element may be formed of light transmissive material. In such a case, the diffraction lens structure may be configured to function as a transmissive diffraction lens.

Optionally or alternatively, the base element may be a lens having an aspherical surface. In such a case, the optical element may be used as an objective lens of an optical pick-up, which is capable of converging at least two beams having different wavelengths on at least two types of optical discs having different data recording densities, respectively. The lens surface may be divided into a common area through which a beam at a low NA, which is necessary and sufficient for an optical disc having a lower data recording density, passes and an exclusive high NA area through which a beam at a high NA, which is necessary only for an optical disc having a higher data recording density, passes. At least a part of the diffraction lens structure formed on the exclusive high NA area may include a plurality of annular zones having the wide zones and the narrow zones.

According to another aspect of the invention, there is provided a diffraction optical element, which includes a base element, and a diffraction lens structure including a plurality of annular zones concentrically arranged about an optical axis of the base element, minute steps extending in a direction of the optical axis being formed between the plurality of annular zones, the plurality of annular zones being formed on a surface of the base element. The diffraction lens structure may be configured to utilize m-th order diffraction component, m being an integer greater than one. In this case, the diffraction lens structure may include steps each of which primarily provides an optical path difference of m times a working wavelength, each of the steps minutely provides a plurality of sub-steps defined by a plurality of narrow width annular zones each providing an optical path difference of one wavelength.

According to a further aspect of the invention, there is provided an objective lens for an optical pick-up, the objective lens being capable of converging at least two beams having different wavelengths on at least two types of optical discs having different data recording densities, respectively. Such an objective lens may be configured to include a refractive lens having a positive power, a diffraction lens structure including a plurality of annular zones concentrically arranged about an optical axis of the refractive lens, minute steps extending in a direction of the optical axis being formed between the plurality of annular zones, the plurality of annular zones being formed on a surface of the refractive lens. The refraction surface of the lens may be divided into a common area through which a beam at a low NA, which is necessary and sufficient for an optical disc having a lower data recording density, passes and an exclusive high NA area through which a beam at a high NA, which is necessary only for an optical disc having a higher data recording density, passes. The annular zones formed in the exclusive high NA area include at least one narrow zone satisfying condition (1) and at least one wide zone satisfying condition (2):

$$\Delta Z(i) < (1/2) \cdot \Delta E(i) \quad (1),$$

and $$\Delta Z(i) > (3/2) \cdot \Delta E(i) \quad (2),$$

wherein, i represents the order of the steps counted from the optical axis, $\Delta E(i)$ represents an absolute value of an OPD provided by the i-th step, and $\Delta Z(i)$ represents an absolute value of a difference between OPDs provided, with respect to a base curve, by an inner side end portion and outer side end portion of an annular zone between an i-th step and (i+1)-th step.

Optionally the value of $\Delta E(i)$ is substantially equal to the shortest one of wavelengths to be used.

BRIEF DESCRIPTION OF THE ACCOMPANYING DRAWINGS

FIG. 2A is a front view.

DETAILED DESCRIPTION OF THE EMBODIMENTS

Hereinafter, an embodiment according to the present invention will be described with reference to the accompanying drawings. In the embodiment, the optical element is described as an objective lens of an optical pick-up.

Figure 1A:
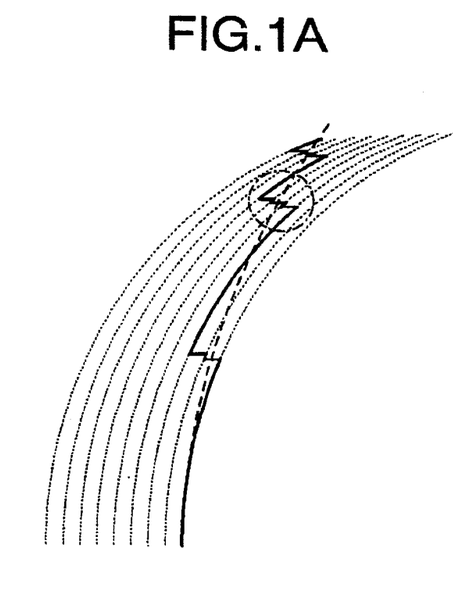
FIG. 1A illustrates the shape of a diffractive optical element according to the embodiment.
Figure 1B:
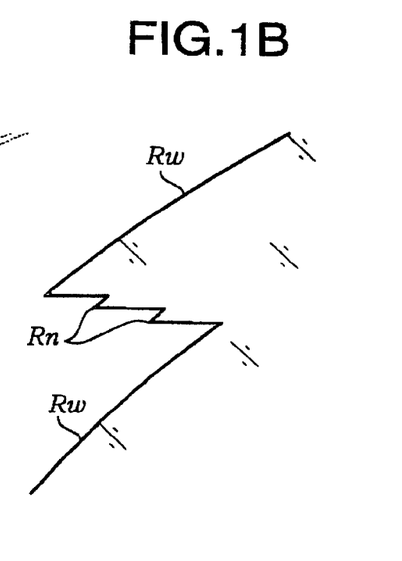
FIG. 1B is an enlarged view of a circled portion in FIG. 1A.
Figure 2A:
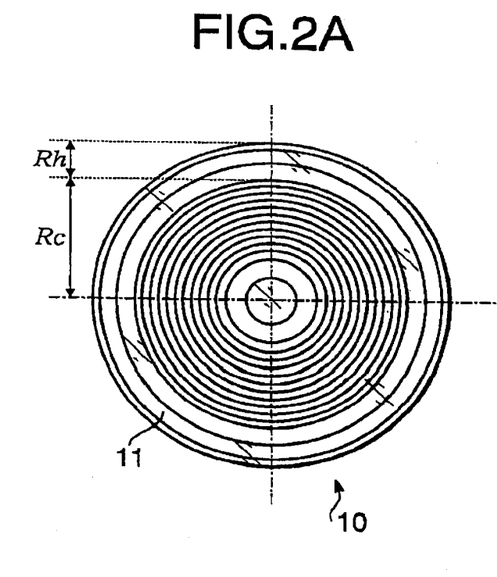
Figure 2B:
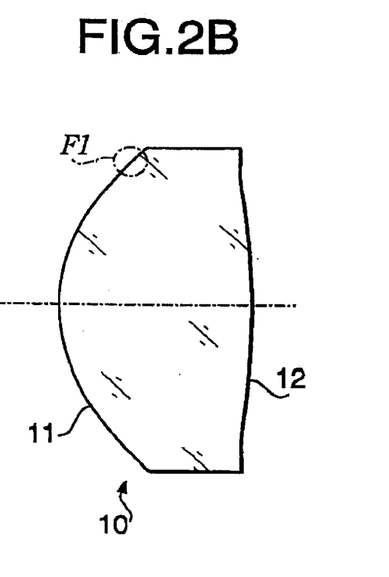
FIG. 2B is a cross-sectional side view of an objective lens according to the embodiment.

FIG. 1A illustrates a shape of adiffractive optical element according to the embodiment, and FIG. 1B is an enlarged view of a circled portion in FIG. 1A. FIG. 2A is a front view, and FIG. 2B is a cross-sectional side view of an objective lens 10 according to the embodiment. FIG. 1A is an enlarged view of a dotted-line circle F1 of FIG. 2B.

The objective lens 10 is a biconvex lens made of resin as shown in FIG. 2B. Two refraction surfaces 11 and 12 of the objective lens are aspherical surfaces. On the surface 11, a diffraction lens structure having a plurality of concentric annular zones, as shown in FIG. 2A, are formed. The center of each zone is the optical axis of the objective lens 10. That is, the diffraction lens structure described above is formed on the base curve, which is the refraction surface 11 of the objective lens 10.

The surface of the objective lens 10 is divided into two portions: a central portion (which will be referred to as a common area) Rc; and the remaining peripheral portion (i.e., outside the common area Rc) will be referred to as an exclusive high NA area Rh.

A light beam for recording/reading out data on the CD or CD-R which has a relatively low recording density, passes through the common area Rc, and is converged on the CD or CD-R. A light beam for recording/readout of data on the DVD which has a relatively high recording density, passes through the common area Rc and the exclusive high NA area Rh, and is converged on the DVD. The diffraction lens structure is formed over both the common area Rc and the exclusive high NA area Rh. The common area Rc is designed as an area within a boundary which corresponds to NA whose value is within a range of 0.45 through 0.50.

The diffraction lens structure formed in the common area Rc utilizes a first order diffraction component. Therefore, similarly to the structure shown in FIG. 6, each of the steps between the annular zones provides the OPD of approximately one wavelength.

The diffraction lens structure formed in the exclusive high NA area Rh utilizes an m-th order diffraction component (m being an integer greater than one). Therefore, each step primarily provides the OPD of m times the wavelength, as exemplarily indicated in FIG. 1A. Specifically, in FIG. 1A, a step shown at a lower portion of the figure provides the OPD of two wavelengths, and the other two steps respectively provide the OPD of three wavelengths.

The diffraction lens structure formed in the exclusive high NA area Rh includes a plurality of wide zones Rw and a plurality of narrow zones Rn which are arranged between the wide zones Rw. Minutely, a step is formed, as shown in FIG. 1B, to have three sub-steps formed by the narrow annular zones Rn, each sub-step providing an OPD of one wavelength.

The narrow zone Rn and the wide zones Rw are formed to satisfy the following conditions (1) and (2), respectively.

$$\Delta Z(i) < (1/2) \cdot \Delta E(i) \quad (1)$$

$$\Delta Z(i) > (3/2) \cdot \Delta E(i) \quad (2)$$

where, i represents the order of the steps counted from the optical axis, $\Delta E(i)$ represents an absolute value of an OPD provided by the i-th step, and $\Delta Z(i)$ represents an absolute value of a difference between OPDs provided, with respect to a base curve (indicated by broken lines having a longer pitch in FIG. 1A) by an inner side end portion and outer side end portion of an annular zone between an i-th step and (i+1)-th step.

In the conventional structure shown in FIG. 6, the OPDs provided by the inner side end and outer side end of the annular zone between the first and second steps are +0.5λ and −0.5λ, respectively. Therefore, for this zone, $\Delta Z(1)=1\lambda$. $\Delta Z$ can be calculated similarly for the outer zones. While, $\Delta E(i)$ provided by the steps are all 1λ. Therefore, in the example shown in FIG. 6, regardless of the value of i, $\Delta Z(i)=\Delta E(i)$, and its value is 1λ, which does not have annular zones satisfying the conditions (1) and (2).

In the conventional structure shown in FIG. 7A, the OPDs provided by the inner side end and outer side end of the annular zone between the first and second steps are +1.5λ and −1.5λ, respectively. Therefore, for this zone, $\Delta Z(1)=3\lambda$. $\Delta Z$ can be calculated similarly for the outer zones. While, $\Delta E(i)$ provided by the steps are: 2λ when i=1; and 3λ when $i \geq 2$. Therefore, the example shown in FIG. 7A, does not have an annular zone satisfying the conditions (1) and (2).

In the structure shown in FIG. 1A, the narrow zones Rn are formed such that the OPDs provided by the inner side end and the outer side end are substantially the same, and therefore, $\Delta Z(i)$ is substantially equal to zero. A wide zone Rw, for example the one between the second and the third steps in FIG. 1A, is formed such that the OPDs provided by the inner side end and outer side end of the annular zone between the first and second steps are +1.5λ and −1.5λ, respectively. Therefore, for this zone, $\Delta Z(2)=3\lambda$. $\Delta Z$ can be calculated similarly for the other wide zones. Accordingly, for i=1, 3, 4, 6, 7, . . . $\Delta Z(i)$ is substantiallyzero, while for i=2, 5, . . . $\Delta Z(i)$ equals to 3λ. While, $\Delta E(i)$ provided at each step is 1λ regardless of the value of i. Therefore, in the structure shown in FIG. 1A, the narrow zones Rn satisfy condition (1), while the wide zones Rw satisfy condition (2). It should be noted that, in the above description, the steps shown at the lowermost part in the drawings are indicated as the first step (i.e., i=1) for the sake of simplifying the description. Since the portion shown, for example in FIG. 1A, is a portion of the exclusive high NA area, the actual value of i is a greater value including the number of steps in the common area Rc.

It should be noted that, the values of $\Delta Z(i)$ and $\Delta E(i)$ are calculated using the wavelength for a disc having a greater data recording density.

According to the above-described configuration, when relatively large steps are to be formed in order to use a relatively high order diffraction light, by forming narrow zones Rn, effects of the dulled shape as shown in FIG. 1B by solid lines can be suppressed, and higher diffraction efficiency can be achieved than a case where large steps are formed without sub-steps as shown in FIG. 7A.

For example, if the diffraction lens structure in the exclusive high NA area Rh is formed as shown in FIG. 6, which provides the OPD of one wavelength, light utilization efficiency of the objective lens as a whole (including the coating loss and the like) is 87.8%. Further, if the diffraction lens structure in the exclusive high NA area Rh is formed as shown in FIG. 7A, that is, if the steps provide the OPD of three times the wavelengths without sub-steps, the light utilization efficiency is 85.6%. If the sub-steps are introduced as shown in FIG. 1A, the light utilization efficiency is 87.7%. Thus, in this case, even when the high order diffraction components are utilized, the light utilization efficiency substantially the same as that when the first order diffraction component is utilized can be maintained.

Figure 3:
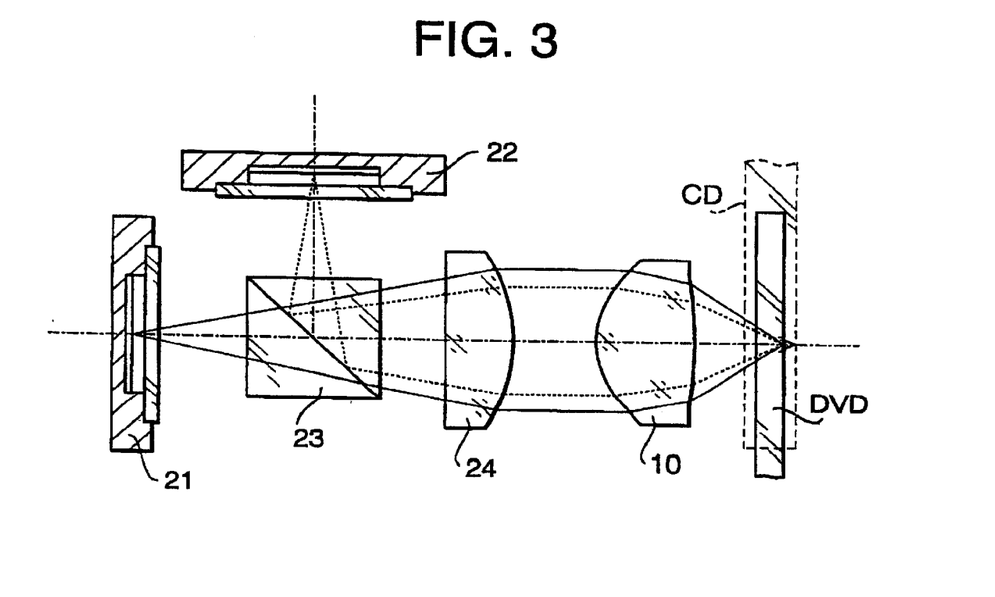
FIG. 3 schematically illustrates a configuration of an optical system of an optical pick-up employing an objective lens according to the embodiment.

FIG. 3 schematically shows a configuration of an optical pick-up employing the objective lens 10 shown in FIGS. 2A–2B.

The optical pick-up shown in FIG. 3 includes a DVD light source module 21, a CD light source module 22, a beam combiner 23, a collimating lens 24 and the objective lens 10. Each of the DVD light source module 21 and the CD light source module 22 is a module provided with an integrally mounted laser diode and a photo sensor.

A light beam having a relatively long wavelength is used for the CD or CD-R, while a light beam having a relatively short wavelength is used for the DVD. According to the embodiment, the DVD light source module 21 has a laser diode which emits a laser beam having a wavelength of 654 nm, and the CD light source module 22 has a laser diode which emits a laser beam having a wavelength of 790 nm.

When the DVD is used, the DVD light source module 21 is used. In FIG. 3, a cover layer of the DVD is shown by a solid line. The laser beam emitted by the DVD light source module 21 is converged on a data recording surface, which corresponds to the right-hand side of the cover layer) of the DVD as indicated by solid lines in FIG. 3.

When the CD (or CD-R) is used, the CD light source module 22 is used. In FIG. 3, a cover layer of the CD (or CD-R) is shown by a broken line. The laser beam emitted by the CD light source module 22 is converged on a data recording surface, which corresponds to the right-hand side of the cover layer, of the CD (or CD-R) as indicated by broken lines in FIG. 3. It should be noted that, in FIG. 3, only the beams which contribute to recording/readout of the data on the disc are indicated.

The diffraction lens structure formed within the common area Rc is designed such that the diffraction efficiency of the first order diffraction light is the highest for the plurality of wavelengths (in this embodiment, two wavelengths: 654 nm and 790 nm).

Further, the diffraction lens structure within the common area Rc is designed such that the variation of the spherical aberration due to the difference of the thickness of the cover layers of the DVD (thickness: 0.6 mm) and CD (or CD-R) (thickness: 1.2 mm) is compensated for by switching the wavelengths of the used beams between 654 nm and 790 nm.

It is generally known that the spherical aberration of the entire optical system, including the cover layer of the optical disc, changes in an overcorrected direction as the thickness of the cover layer becomes thicker. When the DVD, which has a thinner cover layer, is used, a beam having a shorter wavelength is used, and when the CD, which has a thicker cover layer, is used, a beam having a longer wavelength is used. In view of this fact, the diffraction lens structure is designed such that the spherical aberration has a wavelength dependency, i.e., the spherical aberration changes in an undercorrected direction when the wavelength increases. With this configuration, by appropriately designing the diffraction lens structure, the spherical aberration which changes in the overcorrected direction as the thickness of the cover layer increases can be canceled by the spherical aberration of the diffraction lens structure which changes in the undercorrected direction as the wavelength increases from 654 nm to 790 nm.

The diffraction lens structure formed within the exclusive high NA area Rh is designed to have a function of converging the beam having the wavelength of 654 nm, and diffusing the beam having the wavelength of 790 nm. The base curve and an OPD function of the exclusive high NA area Rh are determined such that the beam having the wavelength of 654nm is sufficiently converged on the DVD. Further, according to the invention, the diffraction lens structure formed in the exclusive high NA area Rh is designed to compensate for chromatic aberration which may be caused as the wavelength of the laser beam is varied, and aberrations based on the change of refractive index and/or shape due to the temperature change. In order to realize the aberration compensation function and the diameter size limiting function using the diffraction lens structure, it is necessary to use the high order diffraction components. In the objective lens according to the embodiment, the diffraction lens structures primarily provides the OPD of a multiple times the wavelength so that the above functions are realized, while using the sub-steps minutely, so that deterioration of the diffraction efficiency is prevented.

Numerical Embodiment

Hereinafter, the numerical data of the objective lens according to the embodiment will be described. The objective lens according to the embodiment is for an optical pick-up which is used both for the DVD having a cover layer of 0.6 mm thick, and the CD (or CD-R) having a cover layer of 1.2 mm thick.

TABLE 1 below indicates numerical data of the objective lens according to the embodiment.

The first surface (the light source side surface) of the objective lens is divided into the common area Rc, for which the height h from the optical axis is $0 \leq h < 1.538$ (mm), and the exclusive high NA area Rh, for which the height h from the optical axis is $1.538 \leq h \leq 2.023$ (mm). In the common area Rc and the exclusive high NA area Rh, diffraction lens structures expressed by different OPD functions are formed, respectively. The base curves (i.e., the shape of the lens surface excluding the diffraction lens structure) of the common area Rc and that of the exclusive high NA area Rh are also different, both of which are aspherical surfaces defined by different coefficients.

The second surface (disc side surface) of the objective lens is an aspherical surface, which is not formed with a diffraction lens structure.

In this embodiment, there are four wide zones provided in the exclusive high NA area Rh. The macroscopic steps provided by the wide zones are five times the wavelengths. Each step is divided into sub-steps defined by narrow zones, each providing the OPD of one wavelength. Thus, between the adjoining wide zones, four narrow annular zones are arranged.

The additional optical path added by the diffraction lens structure is expressed by the OPD (optical path difference) function φ(h) indicated below.

$$\phi(h) = (P_2 h^2 + P_4 h^4 + P_6 h^6 + \ldots) \times m \times \lambda$$

where, Pn represents n-th order (n being even number) OPD function coefficients, m represents a diffraction order, and λ represents the wavelength.

The OPD function φ(h) represents a difference of an optical path of a beam which would not be diffracted by the diffraction lens structure and an optical path of the beam which has been diffracted by the diffraction lens structure, at a point on the objective lens whose height with respect to the optical axis is h.

The aspherical surface is expressed by a polynomial indicated below.

$$X(h) = \frac{Ch^2}{1 + \sqrt{1 - (1+\kappa)C^2 h^2}} + A_4 h^4 + A_6 h^6 + A_8 h^8 + A_{10} h^{10} + A_{12} h^{12}$$

where, X(h) is a SAG amount representing a distance between a plane tangential to the aspherical surface at a point where the optical axis intersects with the aspherical surface and a point on the aspherical surface whose height with respect to the optical axis is h. C represents a curvature (=1/r) of the aspherical surface on the optical axis, κ is a conical coefficient, $A_4$, $A_6$, $A_8$, $A_{10}$ and $A_{12}$ are forth, sixth, eighth, tenth, and twelfth order aspherlcal coefficients.

In TABLE 1, coefficients defining the base curves, the diffraction lens structure of the common area Rc of the first surface (i.e., the light source side surface) of the objective lens, coefficients defining the diffraction lens structure in the exclusive high NA area, a distance between adjoining surface on the optical axis, refractive indexes, and coefficients defining the second surface, which is an aspherical surface, are provided.

TABLE 1

FIRST SURFACE

Common Area Rc ($0 \leq h < 1.538$)

| Base Curve | | Diffraction Lens structure | |
|---|---|---|---|
| paraxial radius of curvature | 2.131 mm | blaze wavelength | 720 nm |
| Aspherical surface coefficients | | OPD function coefficients | |
| κ | −0.500 | $P_2$ | −1.50000 |
| $A_4$ | −2.07000 × 10$^{-3}$ | P4 | −1.63000 |
| $A_6$ | −1.05600 × 10$^{-4}$ | $P_6$ | −0.16000 |
| $A_8$ | −1.32300 × 10$^{-4}$ | $P_8$ | 0.00000 |
| $A_{10}$ | 4.63600 × 10$^{-5}$ | $P_{10}$ | 0.00000 |
| $A_{12}$ | −1.00000 × 10$^{-5}$ | $P_{12}$ | 0.00000 |

Exclusive high NA Area Rh ($1.538 \leq h \leq 2.023$)

| Base Curve | | Diffraction Lens structure | |
|---|---|---|---|
| paraxial radius of curvature | 2.148 mm | blaze wavelength | 654 nm |
| Aspherical surface coefficients | | OPD function coefficients | |
| κ | −0.500 | $P_2$ | −3.03517 |
| $A_4$ | −9.83900 × 10$^{-4}$ | P4 | −0.74300 |
| $A_6$ | 8.70200 × 10$^{-5}$ | $P_6$ | −0.14100 |
| $A_8$ | −2.02200 × 10$^{-5}$ | $P_8$ | 0.00000 |
| $A_{10}$ | 6.60440 × 10$^{-5}$ | $P_{10}$ | 0.00000 |
| $A_{12}$ | −1.16640 × 10$^{-5}$ | $P_{12}$ | 0.00000 |

SECOND SURFACE

| | |
|---|---|
| paraxial radius of curvature | −8.185 mm |
| Aspherical surface coefficients | |
| κ | 0.000 |
| $A_4$ | 1.42800 × 10$^{-2}$ |
| $A_6$ | −2.04300 × 10$^{-3}$ |
| $A_8$ | −9.30800 × 10$^{-5}$ |
| $A_{10}$ | −1.64700 × 10$^{-5}$ |
| $A_{12}$ | 6.74500 × 10$^{-6}$ |
| a distance between First and Second surfaces | 2.200 mm |
| refractive index at 645 nm | 1.54067 |
| at 790 nm | 1.53657 |
| working distance (i.e., a distance from the second surface to the disc surface) DVD is used | 1.754 mm |
| CD is used | 1.387 mm |

TABLE 2 shows the height hin, from the optical axis, of the inner side end, and the height hout, from the optical axis, of the outer side end of each annular zone, to which a zone number N is assigned from the optical axis side, a circular zone including the optical axis being indicated as zone #0. Thus, a zone outside an i-th step is an i-th zone. Further, in TABLE 2, the value of the OPD function φ(hout) at the outer side end of each annular zone is shown. In TABLE 2, unit of the values are mm for hin and hout, and the value of the OPD function φ(hout) is represented by a unit of wavelength. Zones 0–14 are formed in the common area Rc, and zones 15–35 (see TABLE 3) are formed in the exclusive high NA area Rh.

TABLE 2

| N | hin | hout | φ(hout) |
|---|---|---|---|
| #0 | 0.000 | 0.509 | −0.500 |
| #1 | 0.509 | 0.771 | −1.500 |
| #2 | 0.771 | 0.916 | −2.500 |
| #3 | 0.916 | 1.020 | −3.500 |
| #4 | 1.020 | 1.101 | −4.500 |
| #5 | 1.101 | 1.169 | −5.500 |
| #6 | 1.169 | 1.227 | −6.500 |
| #7 | 1.227 | 1.278 | −7.500 |
| #8 | 1.278 | 1.324 | −8.500 |
| #9 | 1.324 | 1.365 | −9.500 |
| #10 | 1.365 | 1.403 | 10.500 |
| #11 | 1.403 | 1.438 | −11.500 |
| #12 | 1.438 | 1.471 | −12.500 |
| #13 | 1.471 | 1.501 | −13.500 |
| #14 | 1.501 | 1.538 | −14.786 |

TABLE 3 shows the height hin, from the optical axis, of the inner side end, and the height hout, from the optical axis, of the outer side end of each annular zone. Further, in TABLE 3, the value of the OPD function φ(hout) with respect to the ray passed through the outer side end of each annular zone, and the width W of each zone projected on the tangential plane are indicated.

TABLE 3

| N | hin | hout | φ(hout) | W |
|---|---|---|---|---|
| #15 | 1.538 | 1.668 | −17.219 | 0.130 |
| #16 | 1.668 | 1.672 | −17.359 | 0.004 |
| #17 | 1.672 | 1.676 | −17.500 | 0.004 |
| #18 | 1.676 | 1.680 | −17.642 | 0.004 |
| #19 | 1.680 | 1.684 | −17.785 | 0.004 |
| #20 | 1.684 | 1.794 | −22.148 | 0.110 |
| #21 | 1.794 | 1.798 | −22.323 | 0.004 |
| #22 | 1.798 | 1.802 | −22.500 | 0.004 |
| #23 | 1.802 | 1.806 | −22.678 | 0.004 |
| #24 | 1.806 | 1.810 | −22.858 | 0.004 |
| #25 | 1.810 | 1.896 | −27.077 | 0.087 |
| #26 | 1.896 | 1.900 | −27.288 | 0.004 |
| #27 | 1.900 | 1.904 | −27.500 | 0.004 |
| #28 | 1.904 | 1.908 | −27.714 | 0.004 |
| #29 | 1.908 | 1.912 | −27.929 | 0.004 |
| #30 | 1.912 | 1.983 | −32.007 | 0.071 |
| #31 | 1.983 | 1.987 | −32.253 | 0.004 |
| #32 | 1.987 | 1.991 | −32.500 | 0.004 |
| #33 | 1.991 | 1.995 | −32.749 | 0.004 |
| #34 | 1.995 | 2.023 | −34.500 | 0.027 |

Figure 4:
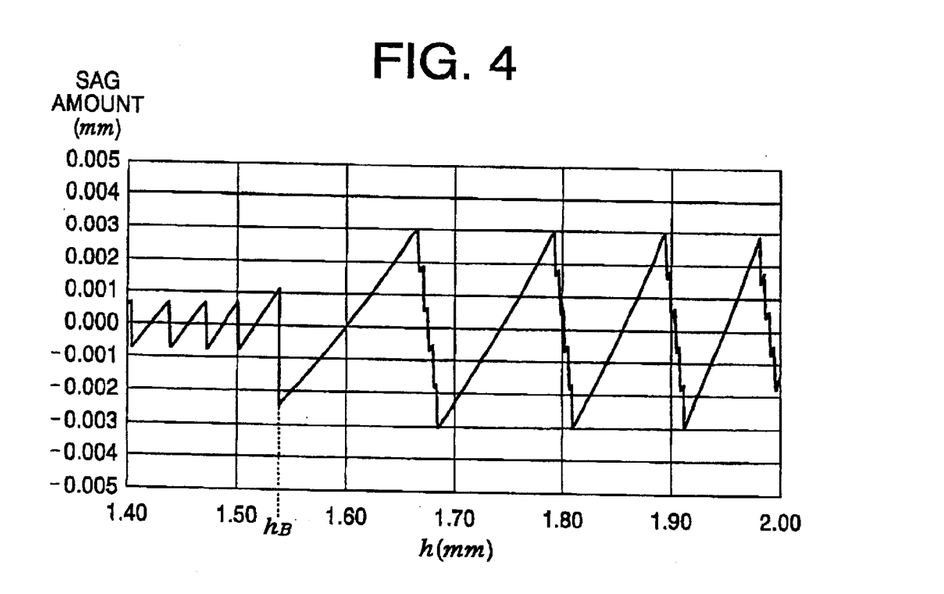
FIG. 4 is a graph showing a SAG amount of a diffractive lens structure formed on an objective lens according to an embodiment.

FIG. 4 is a graph showing a SAG amount of the diffraction lens structure with respect to the base curve of within a range of h=1.40 mn to h=2.00 mm, i.e., at a peripheral portion of the common area Rc to substantially the outer end of the exclusive high NA area Rh. A large step at h=$h_B$=1.538 represents a boundary between the common area Rc and the exclusive high NA area Rh.

As indicated in TABLE 3, zones #15, #20, #25 and #30 are wide zones Rw, and zones #16–19, #21–24 and #26–29 are narrow zones Rn. As shown in FIG. 4, ΔE(i) constant (i.e., equals to 1λ) regardless of the value of the i. ΔZ(i) is substantially zero when i equals to 16–19, 21–24 and 26–29, while ΔZ(i) equals to substantially 5λ when i equals to 15, 20, 25 and 30. Accordingly, the narrow zones Rn satisfy the condition (1), and the wide zones Rw satisfy the condition (2).

Figure 5:
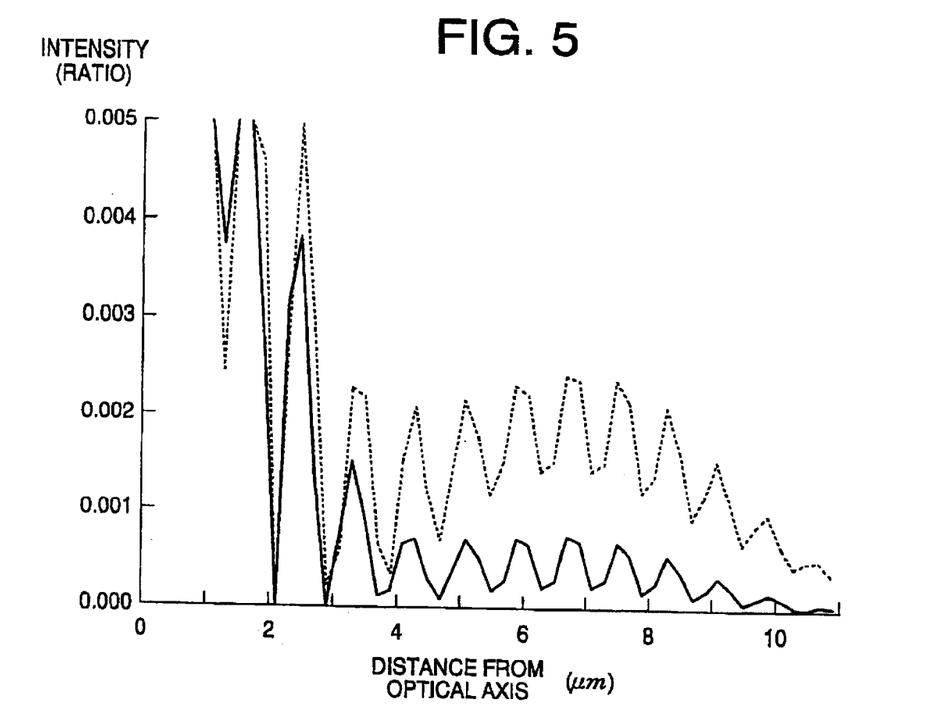
FIG. 5 is a graph showing an intensity distribution of light having a wavelength for a CD converged by the objective lens according to the embodiment of the invention.

FIG. 5 is a graph showing light intensity distribution on a CD using the objective lens according to a comparative example (indicated by broken line) and the objective lens according to the embodiment (indicated by solid line). In the vertical axis, the intensity is normalized such that the intensity of light on the optical axis is indicated as 1 (one). The horizontal axis indicates a distance with respect to the optical axis. In order to show the intensity in the vicinity of the boundary of the beam spot for CD, the vertical axis only indicates the upper limit of 0.005, and therefore, the intensity of light at portions closer to the optical axis is not shown in the graph since it is much greater than the upper limit.

The comparative example is configured such that the steps of the zones formed in the exclusive high NA area Rh provide the OPD of one wavelength, and the other configuration is the same as that of the embodiment. According to the comparative example, if the aberrations are well compensated, the beam size cannot be restricted sufficiently when the CD (or CD-R) is used. Therefore, the intensity distribution of light that is incident on a portion in the vicinity of the boundary of the beam spot for the CD (i.e., at a portion where the height h ranges from 5 through 10 μm) becomes relatively large.

According to the embodiment, as shown in FIG. 5, the intensity distribution of light incident on a portion in the vicinity of the boundary of the beam spot for the CD (i.e., at a portion where the height h ranges from 5 through 10 μm) can be suppressed to a level weaker than that of the comparative example. Further, variation of the wavefront aberrations due to change of temperature and/or wavelength when the DVD is used can also be well suppressed.

The present disclosure relates to the subject matter contained in Japanese Patent Application No. 2001-218122, filed on Jul. 18, 2001, which is expressly incorporated herein by reference in its entirety.

What is claimed is:

1. A diffraction optical element, comprising:

a base element; and a diffraction lens structure including a plurality of annular zones concentrically arranged about an optical axis of said base element, minute steps extending in a direction of said optical axis being formed between said plurality of annular zones, said plurality of annular zones being formed on a surface of said base element, wherein said plurality of annular zones include at least one narrow zone satisfying condition (1) and at least one wide zone satisfying condition (2):

$$\Delta Z(i) < (1/2) \cdot \Delta E(i) \tag{1}$$

and $$\Delta Z(i) > (3/2) \cdot \Delta E(i) \tag{2}$$

wherein, i represents the order of the steps counted from the optical axis, ΔE(i) represents an absolute value of an OPD provided by the i-th step, and ΔZ(i) represents an absolute value of a difference between OPDs provided, with respect to a base curve, by an inner side end portion and outer side end portion of an annular zone between an i-th step and (i+1)-th step.

2. The diffraction optical element according to claim 1, which includes a plurality of wide zones and a plurality of narrow zones.

3. The diffraction optical element according to claim 1, wherein the value of ΔE(i) is substantially equal to the shortest one of wavelengths to be used.

4. The diffraction optical element according to claim 1, wherein a plurality of narrow zones are arranged between a pair of wide zones.

5. The diffraction optical element according to claim 1,
wherein said base element is formed of light transmissive material, and
wherein said diffraction lens structure functions as a transmissive diffraction lens.

6. The diffraction optical element according to claim 5, wherein said base element is a lens having an aspherical surface.

7. The diffraction optical element according to claim 6, which is used as an objective lens of an optical pick-up, which is capable of converging at least two beams having different wavelengths on at least two types of optical discs having different data recording densities, respectively, said lens having the aspherical surface having a common area through which a beam at a low NA, which is necessary and sufficient for an optical disc having a lower data recording density, passes and an exclusive high NA area through which a beam at a high NA, which is necessary only for an optical disc having a higher data recording density, passes, at least a part of said diffraction lens structure formed on said exclusive high NA area includes a plurality of annular zones having said at least one wide zone and said at least one narrow zone.

8. A diffraction optical element, comprising:

a base element; and a diffraction lens structure including a plurality of annular zones concentrically arranged about an optical axis of said base element, minute steps extending in a direction of said optical axis being formed between said plurality of annular zones, said plurality of annular zones being formed on a surface of said base element, wherein said diffraction lens structure utilizes m-th order diffraction component, m being an integer greater than one, said diffraction lens structure including steps each of which primarily provides an optical path difference of m times a working wavelength, each of said steps minutely provides a plurality of sub-steps defined by a plurality of narrow width annular zones each providing an optical path difference of one wavelength.

9. An objective lens for an optical pick-up, said objective lens being capable of converging at least two beams having different wavelengths on at least two types of optical discs having different data recording densities, respectively, said objective lens comprising:

a refractive lens having a positive power;

a diffraction lens structure including a plurality of annular zones concentrically arranged about an optical axis of said refractive lens, minute steps extending in a direction of said optical axis being formed between said plurality of annular zones, said plurality of annular zones being formed on a surface of said refractive lens, refraction surface of said lens being divided into a common area through which a beam at a low NA, which is necessary and sufficient for an optical disc having a lower data recording density, passes and an exclusive high NA area through which a beam at a high NA, which is necessary only for an optical disc having a higher data recording density, passes, annular zones formed in the exclusive high NA area including at least one narrow zone satisfying condition (1) and at least one wide zone satisfying condition (2):

$$\Delta Z(i) < (1/2) \cdot \Delta E(i) \qquad (1),$$

and $$\Delta Z(i) > (3/2) \cdot \Delta E(i) \qquad (2),$$

wherein, i represents the order of the steps counted from the optical axis, $\Delta E(i)$ represents an absolute value of an OPD provided by the i-th step, and $\Delta Z(i)$ represents an absolute value of a difference between OPDs provided, with respect to a base curve, by an inner side end portion and outer side end portion of an annular zone between an i-th step and (i+1)-th step.

10. The objective lens according to claim 9, wherein the value of $\Delta E(i)$ is substantially equal to the shortest one of wavelengths to be used.

* * * * *